(12) United States Patent
Lee et al.

(10) Patent No.: US 10,018,264 B2
(45) Date of Patent: Jul. 10, 2018

(54) SENSOR MODULE HAVING A GEAR ASSEMBLY

(71) Applicant: Steering Solutions IP Holding Corporation, Saginaw, MI (US)

(72) Inventors: Adam W. Lee, Bay City, MI (US); Jeffrey E. Beyerlein, Frankenmuth, MI (US); Jason T. Rutkiewicz, Saginaw, MI (US); Keith A. Kidder, Saginaw, MI (US); Niklaus A. von Matt, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/355,582

(22) Filed: Nov. 18, 2016

(65) Prior Publication Data

US 2018/0142772 A1 May 24, 2018

(51) Int. Cl.
| | |
|---|---|
| *G01L 3/02* | (2006.01) |
| *F16H 55/17* | (2006.01) |
| *F16H 55/08* | (2006.01) |
| *B62D 15/02* | (2006.01) |
| *G01D 5/12* | (2006.01) |
| *G01L 3/04* | (2006.01) |

(52) U.S. Cl.
CPC ......... *F16H 55/17* (2013.01); *B62D 15/0215* (2013.01); *F16H 55/08* (2013.01); *G01D 5/12* (2013.01); *G01L 3/04* (2013.01)

(58) Field of Classification Search
CPC ..... F16H 55/17; F16H 55/08; B62D 15/0215; G01D 5/12; G01L 3/04
USPC ...................................................... 73/862.191
See application file for complete search history.

(56) References Cited

U.S. PATENT DOCUMENTS

| | | | | |
|---|---|---|---|---|
| 5,927,149 A | * | 7/1999 | Moody | F16H 55/14 464/89 |
| 7,633,837 B2 | * | 12/2009 | Daout | F16H 55/16 368/220 |
| 2009/0244203 A1 | * | 10/2009 | Mita | B41J 2/14233 347/68 |
| 2014/0208890 A1 | * | 7/2014 | Takayanagi | B62D 15/0215 74/552 |

* cited by examiner

*Primary Examiner* — Max Noori
(74) *Attorney, Agent, or Firm* — Cantor Colburn LLP

(57) ABSTRACT

A gear includes a gear body and a first gear tooth. The gear body extends radially between an outer portion and an inner portion. The first gear tooth has a first tooth portion, a second tooth portion, and a first slot. The first tooth portion extends radially from the outer portion towards a first land. The second tooth portion is circumferentially spaced apart from the first tooth portion and extends radially from the outer portion towards a second land. The first slot is defined between the first tooth portion and the second tooth portion and extends from at least one of the first land and the second land towards a first slot root.

20 Claims, 2 Drawing Sheets

SENSOR MODULE HAVING A GEAR ASSEMBLY

BACKGROUND OF THE INVENTION

Position detection assemblies are provided with a steering assembly to measure a rotational position of a steering shaft. The rotational position of the steering shaft is provided to a control system to aid in determining an amount of power steering assist that is provided by a power steering assist unit.

SUMMARY OF THE INVENTION

According to an embodiment of the present disclosure, a sensor module is provided. The sensor module includes a sensor housing and a sensor assembly. The sensor housing is configured to at least partially rotatably receive a driving gear through which a shaft assembly extends. The driving gear has a first driving gear tooth, a second driving gear tooth, and a driving gear root disposed between the first driving gear tooth and the second driving gear tooth. The sensor assembly is disposed on the sensor housing. The sensor assembly includes a first gear that is rotatably disposed on the sensor housing. The first gear has a first gear first tooth that is received between the first driving gear tooth and the second driving gear tooth. The first gear first tooth defines a first slot that extends from a first gear tooth land towards a first slot root.

According to another embodiment of the present disclosure, a sensor assembly is provided. The sensor assembly is provided with a sensor module that is arranged to measure at least one of an angular position and a torque of a shaft assembly that is operatively connected to the sensor module. The sensor assembly includes a first gear that has a first gear first tooth and a first gear second tooth. The first gear first tooth is received between a first driving gear tooth and a second driving gear tooth of a driving gear. The first gear first tooth has a first tooth portion that extends between a first land and a first slot root, a second tooth portion that extends between a second land and the first slot root, and a first slot that is defined by the first tooth portion, the second tooth portion, and the first slot root. The first gear second tooth is circumferentially spaced apart from the first gear first tooth by a root undercut.

According to yet another embodiment of the present disclosure, a gear is provided. The gear includes a gear body and a first gear tooth. The gear body extends radially between an outer portion and an inner portion. The first gear tooth has a first tooth portion, a second tooth portion, and a first slot. The first tooth portion extends radially from the outer portion towards a first land. The second tooth portion is circumferentially spaced apart from the first tooth portion and extends radially from the outer portion towards a second land. The first slot is defined between the first tooth portion and the second tooth portion and extends from at least one of the first land and the second land towards a first slot root. The first gear tooth has a first width that is disposed proximate the first slot root and a second width that is disposed proximate a gear pitch circle that is greater than the first width.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
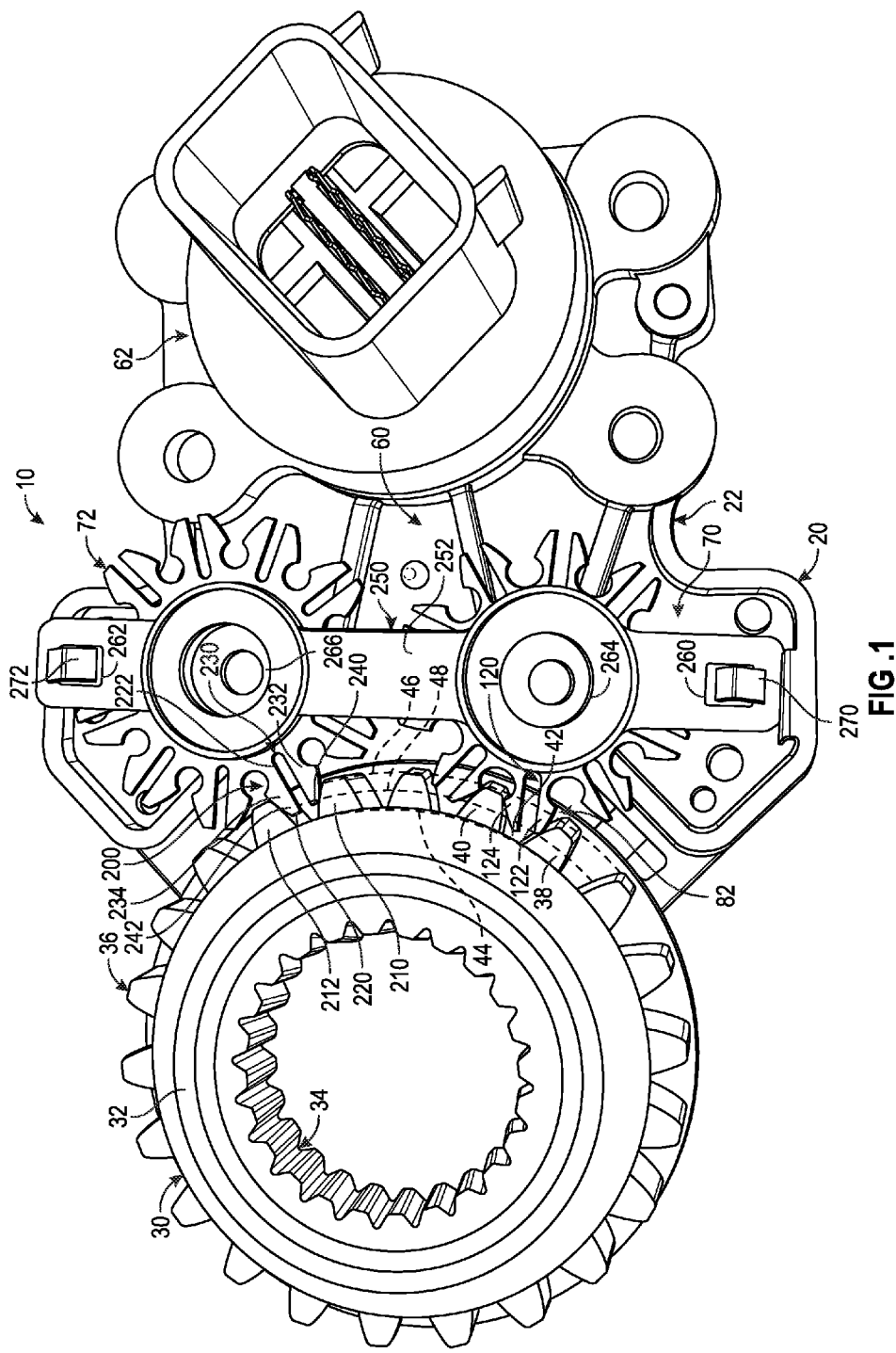
FIG. 1 a partial disassembled view of a sensor module that is provided with a steering assembly.

Referring to FIG. 1, a sensor module 10 is provided with a steering assembly. The sensor module 10 may be provided as part of or may be in communication with a power steering assist unit. The power steering assist unit may be an electric power steering assist unit arranged to assist an operator of the vehicle in pivoting at least one vehicle wheel. The sensor module 10 is arranged to measure a rotational/angular position and/or a torque of a shaft assembly that extends through or is operatively connected to the sensor module 10. The sensor module 10 includes a sensor housing 20 and a sensor assembly 22.

The sensor housing 20 is operatively connected to a support housing to operatively connect the sensor module 10 to the steering assembly. The sensor housing 20 is arranged to rotatably receive a driving gear 30. The driving gear 30 includes a driving gear body 32 that defines an opening having a plurality of inwardly extending engagement elements 34 radially extending towards a centerline of the driving gear body 32. The plurality of inwardly extending engagement elements 34 may be arranged as internal involute teeth or the like. A steering shaft assembly extends at least partially through the opening of the driving gear 30. The steering shaft assembly is operatively connected to the driving gear 30 via the plurality of inwardly extending engagement elements 34.

The driving gear body 32 further includes a plurality of outwardly extending engagement elements 36 that radially extend from an outer surface or outer circumference of the driving gear body 32. The plurality of outwardly extending engagement elements 36 are operatively and/or drivingly connected to the sensor assembly 22, such that the driving gear 30 is arranged to rotate in response to rotation of the steering shaft assembly. The plurality of outwardly extending engagement elements 36 may be arranged as external involute teeth or the like.

The plurality of outwardly extending engagement elements 36 include a first driving gear tooth 38 that is circumferentially spaced apart from a second driving gear tooth 40 by a driving gear root 42. The driving gear root 42 is disposed along a driving gear root circle 44. The tips of at least one of the first driving gear tooth 38 and the second driving gear tooth 40 are disposed along a driving gear tip circle 46. A driving gear pitch circle 48 is radially disposed between the driving gear root circle 44 and the driving gear tip circle 46.

The sensor assembly 22 is disposed on the sensor housing 20. The sensor assembly 22 is operatively connected to the driving gear 30. The sensor assembly 22 is arranged to provide a signal indicative of a rotational/angular position and/or a torque of the shaft assembly to the controller or the electric power steering assist unit.

The sensor assembly 22 includes a gear assembly 60 and a probe housing 62 that receives a sensor or a probe that provide the signal indicative of the rotational/angular position and/or the torque of the shaft assembly to the controller or the electric power steering assist unit.

The gear assembly 60 is rotatably disposed on the sensor housing 20. The gear assembly 60 is configured as a driven gear assembly that is driven by the driving gear 30 in response to rotation of the steering shaft assembly. The gear assembly 60 includes a first gear 70 and a second gear 72 both being rotatably disposed on the sensor housing 20. The first gear 70 and the second gear 72 mesh with the driving gear 30 with little or no load occurring at the mesh.

Figure 2:
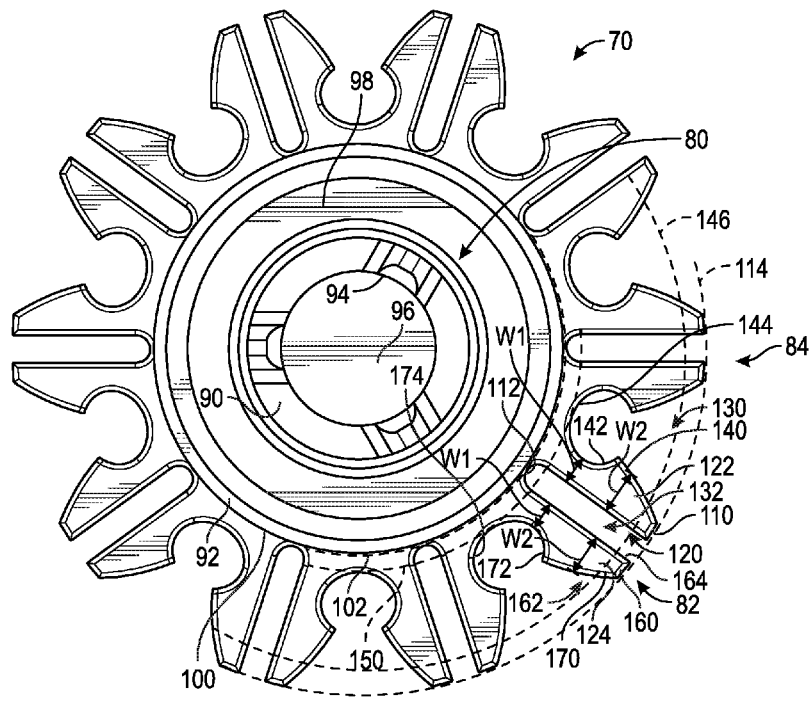
FIG. 2 is a plan view of a gear provided with a sensor assembly of the sensor module.
Figure 3:
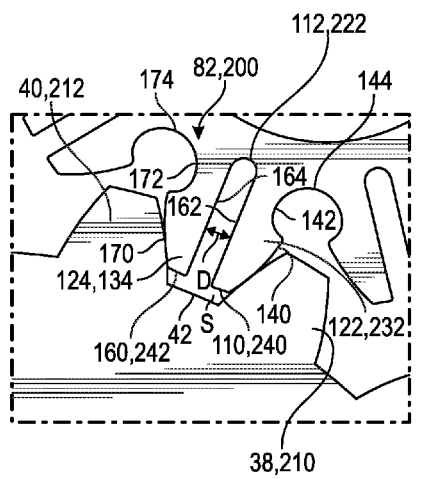
FIGS. 3 and 4 are plan views of the gear and engagement with a driving gear.
Figure 4:
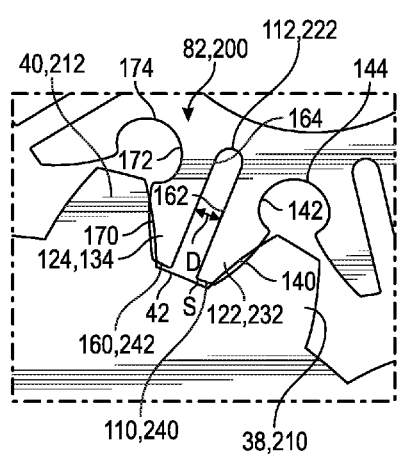

Referring to FIGS. 2-4, the first gear 70 includes a gear body 80, a first gear first tooth 82, and a first gear second tooth 84. The gear body 80 extends radially between an inner portion 90 and an outer portion 92. The inner portion 90 includes an inner surface 94 that at least partially defines an inner pocket 96. The inner pocket 96 is arranged to receive an indicator such as a magnet, a magnetic emitter, or the like. The indicator may emit a magnetic field or other signal that is detected by the probe or sensor that is provided with the probe housing 62. The probe or sensor that is provided with probe housing 62 may detect changes in the magnetic field or the field emitted by the indicator as the first gear 70 rotates or changes rotational/angular position.

The gear body 80 further defines a pocket 98 that is disposed concentrically with the inner portion 90 and the outer portion 92. The pocket 98 is disposed about the inner pocket 96. The pocket 98 extends radially between the inner portion 90 and the outer portion 92. The pocket 98 is configured as a recessed region within the gear body 80 that is radially and circumferentially disposed between the inner portion 90 and the outer portion 92.

The outer portion 92 includes an outer surface 100 that defines an outer circumference of the gear body 80. The outer surface 100 is disposed along a gear root circle 102 of the first gear 70.

The gear body 80 of the first gear 70 may include a plurality of gear teeth. As shown in FIGS. 1 and 2, the first gear 70 includes 10 gear teeth but other numbers of gear teeth are also contemplated. The first gear first tooth 82 extends radially from the outer portion 92 of the gear body 80. The first gear first tooth 82 is received between and is meshingly engaged with the first driving gear tooth 38 and the second driving gear tooth 40. The first gear first tooth 82 radially extends between a first gear tooth first land 110 and a first slot root 112. The first gear tooth first land 110 is disposed along a land circle 114 that is radially spaced apart from the gear root circle 102. The first slot root 112 is disposed along the gear root circle 102.

The first gear first tooth 82 defines a first slot 120 that radially extends from the first gear tooth first land 110 towards the first slot root 112. The first slot 120 at least partially bifurcates the first gear first tooth 82 into a first tooth portion 122 and a second tooth portion 124 that is circumferentially spaced apart from the first tooth portion 122. The first tooth portion 122 and the second tooth portion 124 are arranged as independent cantilevered members. In at least one embodiment, the first tooth portion 122, the second tooth portion 124, and the first slot root 112 define the first slot 120.

The first tooth portion 122 radially extends between the first gear tooth first land 110 and the first slot root 112. The first tooth portion 122 includes a first side 130 and a second side 132.

The first side 130 is arranged to engage a side of the first driving gear tooth 38. The first side 130 has a first flank 140 and a first face 142 that extends into and is at least partially defined by a root undercut 144.

The first flank 140 radially extends from the first gear first tooth first land 110 towards the first face 142. The first flank 140 includes an involute shape such that the first gear 70 is configured as a spur gear or the like. The first face 142 extends from the first flank 140 towards the first slot root 112. A circle 146, such as a pitch circle, extends circumferentially through a junction between the first flank 140 and the first face 142. The circle 146 is radially disposed between the gear root circle 102 and the land circle 114.

The first flank 140 becomes progressively closer to the second side 132 in a direction that extends from the first slot root 112 towards the first gear tooth first land 110. A portion of the first face 142 that extends from the root undercut 144 becomes progressively farther away from the second side 132 in a direction that extends towards the first gear tooth first land 110.

The root undercut 144 circumferentially extends between the first gear first tooth 82 and the first gear second tooth 84. The root undercut 144 circumferentially spaces the first gear first tooth 82 from the first gear second tooth 84. The first face 142 and the root undercut 144 have a substantially arcuate shape. At least a portion of the root undercut 144 is disposed along a root undercut circle 150. The root undercut circle 150 may be radially spaced apart from the gear root circle 102, the land circle 114, and/or the circle 146. The root undercut 144 is shaped such that the root undercut 144 traces a path that the driving gear 30 takes through a section to avoid interference in the root of a tooth.

The second side 132 is disposed opposite the first side 130. The first gear tooth first land 110 extends circumferentially between the distal ends of the first side 130 (first flank 140) and the second side 132.

The first tooth portion 122 has a first width, w1, defined between the first side 130 (e.g. the first face 142 or the root undercut 144) and the second side 132 proximate the first slot root 112. The first tooth portion 122 has a second width, w2, defined between the first side 130 (the first flank 140) and the second side 132 proximate the first gear tooth first land 110. The second width, w2, is greater than the first width, w1.

The second tooth portion 124 is at least partially circumferentially spaced apart from the first tooth portion 122 by the first slot 120. The second tooth portion 124 radially extends between the first slot root 112 and a first gear tooth second land 160. The second tooth portion 124 includes a third side 162 and a fourth side 164.

The third side 162 is arranged to engage a side of the second driving gear tooth 40. The third side 162 has a second flank 170 and a second face 172 that extends into and is at least partially defined by another root undercut 174.

The second flank 170 radially extends from the first gear tooth second land 160 towards the second face 172. The second flank 170 includes an involute shape. The second face 172 extends from the second flank 170 towards the first slot root 112. The circle 146 extends circumferentially through a junction between the second flank 170 and the second face 172.

The second flank 170 becomes progressively closer to the fourth side 164 in a direction that extends from the first slot root 112 towards the first gear tooth second land 160. A portion of the second face 172 that extends from the root undercut 174 becomes progressively farther away from the fourth side 164 in a direction that extends towards the first gear tooth second land 160.

The root undercut 174 circumferentially extends between a gear tooth that is disposed adjacent to at least one of the first gear first tooth 82 and the first gear second tooth 84. The root undercut 174 may be an extension of the root undercut 144. The root undercut 174 may have a substantially similar configuration to the root undercut 144.

The fourth side 164 is disposed opposite the third side 162. The fourth side 164 is spaced apart from and is disposed substantially parallel to the second side 132. The first gear tooth second land 160 extends circumferentially between distal ends of the third side 162 (e.g. second flank 170) and the fourth side 164.

The second tooth portion 124 has a first width, w1, defined between the third side 162 (e.g. the second face 172 or the root undercut 174) and the fourth side 164 proximate the first slot root 112. The second tooth portion 124 has a second width, w2, defined between the third side 162 (e.g. the second flank 170) and the fourth side 164 proximate the first gear tooth second land 160. The second width, w2, is greater than the first width, w1.

The first tooth portion 122 and the second tooth portion 124 are made of a flexible material having a substantially constant spring load, e.g. a pliable plastic, such that the first tooth portion 122 and the second tooth portion 124 are configured to deflect to de-lash the first gear 70 and the driving gear 30. The flexibility of the first tooth portion 122 and the second tooth portion 124 along with the configuration of the first flank 140 and the second flank 170 adds interference, as shown in FIGS. 3 and 4, to maintain double flank contact between the first flank 140 of the first side 130 of the first tooth portion 122 and the side of the first driving gear tooth 38 and the second flank 170 of the third side 162 of the second tooth portion 124 and the side of the second driving gear tooth 40 even at the largest center to center distance, as shown in FIG. 4.

The flexibility of the first tooth portion 122 and the second tooth portion 124 enables a distance, D, defined between the second side 132 and the fourth side 164 to vary based on a spacing, S, between the driving gear root 42 and the first gear tooth first land 110 and the first gear tooth second land 160. For example, as the spacing, S, between the driving gear root 42 and the first gear tooth first land 110 and/or the first gear tooth second land 160 decreases, the distance, D, between the second side 132 and the fourth side 164 due to the deflection of the first tooth portion 122 and/or the second tooth portion 124, such that the first tooth portion 122 is disposed closer to the second tooth portion 124. Conversely, as the spacing, S, between the driving gear root 42 and the first gear tooth first land 110 and/or the first gear tooth second land 160 increases, the distance, D, between the second side 132 and the fourth side 164 increases.

The second gear 72 is rotatably disposed on the sensor housing 20. The second gear 72 is spaced apart from and does not engage the first gear 70. The second gear 72 is configured as a spur gear. As shown in FIG. 1, the second gear 72 includes 11 gear teeth but other numbers of gear teeth are also contemplated. The second gear 72 may have a different number or the same number of gear teeth as the first gear 70. The second gear 72 may have a substantially similar configuration as the first gear 70.

The second gear 72 includes a second gear first tooth 200. The second gear first tooth 200 extends radially from an outer portion of a gear body of the second gear 72. The second gear first tooth 200 is received between and is meshingly engaged with a third driving gear tooth 210 and a fourth driving gear tooth 204 of the driving gear 30 that are circumferentially spaced apart from the first driving gear tooth 38 and the second driving gear tooth 40.

The second gear first tooth 200 radially extends between a second gear tooth land 220 and a second slot root 222. The second gear first tooth 200 defines a second slot 230 that radially extends from the second gear tooth land 220 towards the second slot root 222. The second slot 230 at least partially bifurcates the second gear first tooth 202 into a third tooth portion 232 and a fourth tooth portion 234 that is circumferentially spaced apart from the third tooth portion 232 by the second slot 230. In at least one embodiment, the third tooth portion 232, a fourth tooth portion 234, and the second slot root 222 define the second slot 230.

The third tooth portion 232 radially extends between a second gear tooth first land 240 and the second slot root 222. The third tooth portion 232 has a substantially similar configuration as the first tooth portion 122, e.g. the first side 130 and the second side 132. The first side of the third tooth portion 232 is arranged to engage a side of the third driving gear tooth 210.

The fourth tooth portion 234 is at least partially circumferentially spaced apart from the third tooth portion 232 by the second slot 230. The fourth tooth portion 234 radially extends between a second gear tooth second land 242 and the second slot root 222. The fourth tooth portion 234 has substantially similar configuration as the second tooth portion 124, e.g. the third side 162 and the fourth side 164. The third side of the fourth tooth portion 234 is arranged to engage a side of the fourth driving gear tooth 212.

The third tooth portion 232 and the fourth tooth portion 234 are made of a flexible material having a substantially constant spring load, e.g. a pliable plastic, such that the third tooth portion 232 and the fourth tooth portion 234 are configured to deflect to de-lash the second gear 72 and the driving gear 30. The flexibility of the third tooth portion 232 and the fourth tooth portion 234 along with the configuration of the first side and the third side adds interference to maintain double flank contact between the first side and the side of the third driving gear tooth 210 and the third side and the side of the fourth driving gear tooth 212 even at the largest center to center distance, as shown in FIG. 3.

The flexibility of the third tooth portion 232 and the fourth tooth portion 234 enables a distance defined between the second side of the third tooth portion 232 and the fourth side of the fourth tooth portion 234 to vary based on a spacing between the driving gear root 42 and the second gear tooth first land 240 and the second gear tooth second land 242. For example, as the spacing between the driving gear root 42 and the second gear tooth first land 240 and/or the second gear tooth second land 242 decreases, the distance between the second side of the third tooth portion 232 and the fourth side of the fourth tooth portion 234 decreases due to the deflection of the first tooth portion 122 and/or the second tooth portion 124, such that the third tooth portion 232 is disposed closer to the fourth tooth portion 234. Conversely, as the spacing between the driving gear root 42 and the second gear tooth first land 240 and/or the second gear tooth second land 242 increases, the distance between the second side of the third tooth portion 232 and the fourth side of the fourth tooth portion 234 increases.

The first gear 70 and the second gear 72 are retained within the sensor housing 20 by a gear retainer 250. The gear retainer 250 is configured as an elongate member 252. The elongate member 252 defines a first receiving opening 260, a second receiving opening 262, a first gear opening 264, and a second gear opening 266.

The first receiving opening 260 is disposed at a first end of the elongate member 252. The first receiving opening 260 is configured to receive a first tab 270 that extends from the sensor housing 20. The receiving of the first tab 270 within the first receiving opening 260 secures the first end of the elongate member 252 to a first side of the sensor housing 20. The second receiving opening 262 is disposed at a second end of the elongate member 252 opposite the first end of the elongate member 252.

The second receiving opening 262 is disposed at a second end of the elongate member 252 that is disposed opposite the first end. The second receiving opening 262 is configured to receive a second tab 272 that extends from the sensor housing 20. The receiving of the second tab 272 within the second receiving opening 262 secures the second end of the elongate member 252 to a second side of the sensor housing 20.

The first gear opening 264 and the second gear opening 266 are each disposed between the first receiving opening 260 and the second receiving opening 262. The first gear opening 264 is configured to rotatably receive a portion of the first gear 70. The second gear opening 266 is configured to rotatably receive a portion of the second gear 72.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A sensor module, comprising:
   a sensor housing configured to at least partially rotatably receive a driving gear through which a shaft assembly extends, the driving gear having a first driving gear tooth, a second driving gear tooth, and a driving gear root disposed between the first driving gear tooth and the second driving gear tooth; and
   a sensor assembly disposed on the sensor housing, the sensor assembly including:
      a first gear rotatably disposed on the sensor housing, the first gear having a first gear first tooth that is received between the first driving gear tooth and the second driving gear tooth, the first gear first tooth defining a first slot that extends from a first gear tooth land towards a first slot root,
      the first gear first tooth includes a first tooth portion that is at least partially circumferentially spaced apart from a second tooth portion by the first slot,
      the first tooth portion includes a first side, a second side disposed opposite the first side, and a first land extending between distal ends of the first side and the second side,
      the second tooth portion includes a third side, a fourth side disposed opposite the third side, and a second land extending between distal ends of the third side and the fourth side, and
      the first side is arranged to engage a side of the first driving gear tooth and the third side is arranged to engage another side of the second driving gear tooth.

2. The sensor module of claim 1, wherein the first tooth portion has a first width defined between the first side and the second side proximate the first slot root and a second width defined between the first side and the second side proximate the first land, the second width being greater than the first width.

3. The sensor module of claim 2, wherein the second tooth portion has a first width defined between the third side and the fourth side proximate the first slot root and a second width defined between the third side and the fourth side proximate the second land, the second width being greater than the first width.

4. The sensor module of claim 1, wherein a distance defined between the second side and the fourth side varies based on a spacing between the driving gear root and at least one of the first land and the second land.

5. The sensor module of claim 1, wherein the sensor assembly further including:
   a second gear rotatably disposed on the sensor housing and spaced apart from the first gear, the second gear having a second gear first tooth that is received between a third driving gear tooth and a fourth driving gear tooth.

6. The sensor module of claim 5, wherein the second gear first tooth defines a second slot that extends from a second gear tooth land towards a second slot root.

7. A sensor assembly provided with a sensor module that is arranged to measure at least one of an angular position and a torque of a shaft assembly that is operatively connected to the sensor module, the sensor assembly, comprising:
   a first gear having:
      a first gear first tooth that is received between a first driving gear tooth and a second driving gear tooth of a driving gear, the first gear first tooth having a first tooth portion that extends between a first land and a first slot root, a second tooth portion that extends between a second land and the first slot root, and a first slot defined by the first tooth portion, the second tooth portion, and the first slot root, and
      a first gear second tooth that is circumferentially spaced apart from the first gear first tooth by a root undercut.

8. The sensor assembly of claim 7, wherein the first slot root is radially spaced apart from the root undercut.

9. The sensor assembly of claim 7, wherein the first tooth portion includes a first side having a first flank and a first face, a second side disposed opposite the first side, and the first land extends between the first face and the second side.

10. The sensor assembly of claim 9, wherein the first flank becomes progressively closer to the second side in a direction that extends towards the first land.

11. The sensor assembly of claim 10, wherein a portion of the first face becomes progressively farther away from the second side in the direction that extends towards the first land.

12. The sensor assembly of claim 10, wherein the second tooth portion includes a third side having a second flank and a second face, a fourth side disposed opposite the third side, and the second land extends between the second flank and the fourth side.

13. The sensor assembly of claim 12, wherein the second flank becomes progressively closer to the fourth side in a direction that extends towards the second land.

14. The sensor assembly of claim 7, wherein the sensor assembly further comprising:
    a second gear, spaced apart from the first gear, the second gear having:
        a second gear first tooth that is received between a third driving gear tooth and a fourth driving gear tooth of the driving gear, the second gear first tooth having a third tooth portion that extends between a third land and a second root, a fourth tooth portion that extends between a second land and the second root, and a second slot defined by the third tooth portion, the fourth tooth portion, and the second root, and
        a second gear second tooth that is circumferentially spaced apart from the second gear first tooth by a second root undercut.

15. A gear, comprising:
    a gear body that extends radially between an outer portion and an inner portion; and
    a first gear tooth and a second gear tooth circumferentially spaced apart from the first gear tooth by a root undercut, the first gear tooth having:
        a first tooth portion that extends radially from the outer portion towards a first land, the first tooth portion includes a first side having a first flank that extends from the first land towards a first face that extends into the root undercut,
        a second tooth portion that is circumferentially spaced apart from the first tooth portion and extends radially from the outer portion towards a second land,
        a first slot defined between the first tooth portion and the second tooth portion and extends from at least one of the first land and the second land towards a first slot root, and
        the first gear tooth has a first width disposed proximate the first slot root and a second width disposed proximate a gear pitch circle being greater than the first width.

16. The gear of claim 15, wherein the gear body defines a pocket that is concentric with the outer portion and the inner portion.

17. A sensor module, comprising:
    a sensor housing configured to at least partially rotatably receive a driving gear through which a shaft assembly extends, the driving gear having a first driving gear tooth, a second driving gear tooth, and a driving gear root disposed between the first driving gear tooth and the second driving gear tooth; and
    a sensor assembly disposed on the sensor housing, the sensor assembly including:
        a first gear rotatably disposed on the sensor housing, the first gear having a first gear first tooth that is received between the first driving gear tooth and the second driving gear tooth, the first gear first tooth defining a first slot that extends from a first gear tooth land towards a first slot root, and
        a second gear rotatably disposed on the sensor housing and spaced apart from the first gear, the second gear having a second gear first tooth that is received between a third driving gear tooth and a fourth driving gear tooth.

18. The sensor module of claim 17, wherein the second gear first tooth defines a second slot that extends from a second gear tooth land towards a second slot root.

19. The sensor module of claim 17, wherein the first tooth portion includes a first side, a second side disposed opposite the first side, and a first land extending between distal ends of the first side and the second side and wherein the second tooth portion includes a third side, a fourth side disposed opposite the third side, and a second land extending between distal ends of the third side and the fourth side.

20. The sensor module of claim 19, wherein the first side is arranged to engage a side of the first driving gear tooth and the third side is arranged to engage another side of the second driving gear tooth.

* * * * *